United States Patent [19]

Asanuma

[11] Patent Number: 4,972,914
[45] Date of Patent: Nov. 27, 1990

[54] AUTOMATIC ROAD WHEEL STEERING SYSTEM

[75] Inventor: Nobuyoshi Asanuma, Saitama, Japan

[73] Assignee: Honda Giken Kogyo Kabushiki Kaisha, Tokyo, Japan

[21] Appl. No.: 350,422

[22] Filed: May 10, 1989

Related U.S. Application Data

[63] Continuation of Ser. No. 193,622, May 13, 1988, abandoned.

[30] Foreign Application Priority Data

May 13, 1987 [JP] Japan .................. 62-116476

[51] Int. Cl.$^5$ .............................. B62D 5/04
[52] U.S. Cl. .................. 180/79.1; 180/140; 280/91; 280/95.1; 280/661
[58] Field of Search ............... 180/79.1, 140; 280/91, 280/95.1, 661

[56] References Cited

FOREIGN PATENT DOCUMENTS

| | | |
|---|---|---|
| 2452006 | 7/1975 | Fed. Rep. of Germany . |
| 3536563 | 4/1988 | Fed. Rep. of Germany . |
| 59-94976 | 6/1984 | Japan . |
| 869296 | 5/1961 | United Kingdom . |
| 872782 | 7/1961 | United Kingdom . |
| 2161031 | 1/1986 | United Kingdom . |

*Primary Examiner*—Charles A. Marmor
*Assistant Examiner*—Michael Mar
*Attorney, Agent, or Firm*—Armstrong, Nikaido, Marmelstein, Kubovcik & Murray

[57] ABSTRACT

A system for automatically turning a road wheel. The system utilizes a strut-type suspension including a cylinder connected at one end to a steering knuckle and a piston/piston rod assembly slidable within the cylinder. An actuator is mounted to a vehicle body and operatively connected to the piston rod so as to rotate the same. The piston rod is also operatively connected through a suitable connection to the cylinder so that rotary motion of the piston rod is carried to the cylinder. This causes rotational motion of the steering knuckle and thus the road wheel. The actuator is a motor having elements disposed in surrounding relation to the cylinder to bring the system into a compact arrangement.

2 Claims, 2 Drawing Sheets

FIG. 3
FIG. 1
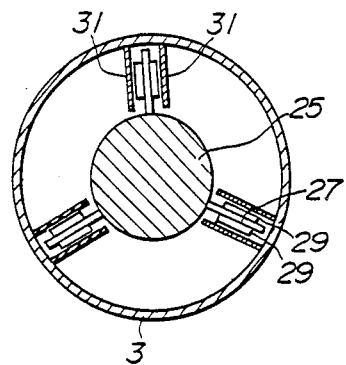
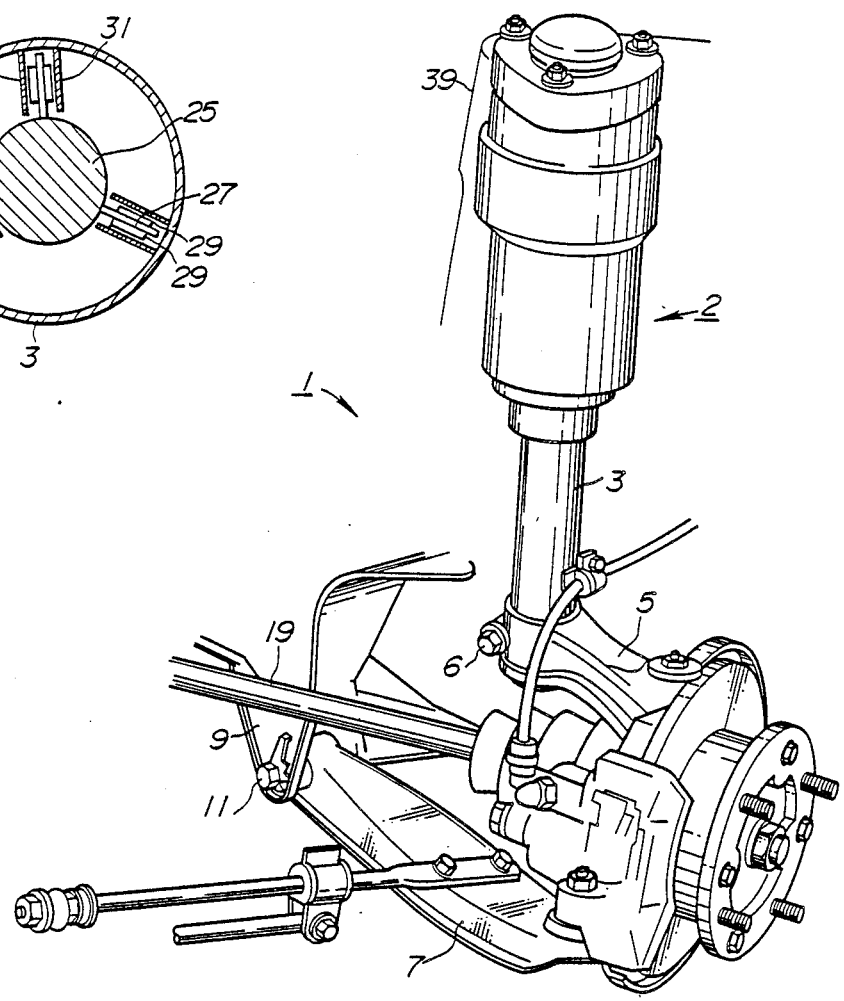

AUTOMATIC ROAD WHEEL STEERING SYSTEM

This is a continuation of application Ser. No. 193,622 filed May 13, 1988 now abandoned.

BACKGROUND OF THE INVENTION

1. Field of the Invention

The present invention generally relates to systems for automatically turning road wheels and more particularly to, an automatic road wheel steering system utilizing a strut-type suspension.

2. Description of the Related Art

A strut-type suspension, better known as MacPherson-strut suspension is light in weight and simple in structure and has, thus, been used in many compact cars. A typical strut-type suspension includes a strut with its upper end fixed to a vehicle body. The strut has at its lower end a ball joint through which a control arm is attached to a spindle. A shock absorber is built into the upper section of the strut, and a coil spring fits around the shock absorber. See "6th edition, Brakes, Suspension, and Steering" by William H. Crouse and Donald L. Anglin (McGraw-Hill Book Company).

Japanese utility model publication No. 59-94976 discloses a strut-type suspension having a shock strut with its upper end rotatably attached to a vehicle body through a suitable bearing assembly, and its lower end having an integral spindle on which a wheel is mounted. A system is provided to automatically turn each steerable wheel. This system generally includes an electric motor attached to the lower side of the vehicle body adjacent to the strut. The output shaft of the motor is connected to the strut through a flexible long shaft by which torque is transmitted to assist turning of the steerable wheel. However, there are a few disadvantages to this system. It is complicated, and is subject to damage because of its location.

SUMMARY OF THE INVENTION

It is, therefore, an object of the present invention to provide an automatic road wheel steering system which is compact and is prevented from being damaged.

According to one aspect of the invention, there is provided a system for automatically steering a road wheel, comprising a strut-type suspension including a cylinder, a piston rod reciprocable within the cylinder, and a piston attached to one end of the piston rod, a wheel support member fixed to the cylinder and rotatably supporting the road wheel thereon, first means for rotating the piston about its axis, said first means mounted to a vehicle body and operatively connected to the other end of the piston rod, and second means for axially guiding the piston rod within the cylinder and operatively connecting the piston rod with the cylinder so that rotary motion of the piston rod may be transmitted to the cylinder.

In a preferred embodiment of the invention, the first means is in the form of an actuator as including a motor having a cylindrical stator mounted to the vehicle body and having a plurality of permanent magnets, a rotor sleeve rotatably supported on the stator in coaxial relation and having a coil. The rotor is connected through a speed reducer to a drive member which is, in turn, fixed to the upper end of the piston rod so as to rotate the same. The piston has a plurality of radial vanes, each vane having opposite side wings which are fitted within guides formed on the inner peripheral surface of the cylinder. This arrangement allows the piston rod to both slide axially and rotate about its axis within the cylinder. Rotary motion of the piston rod is transmitted through the connection to the cylinder, causing turning of the road wheel.

The actuator is disposed in surrounding relation to the upper section of the cylinder, rather than being separate from the strut-type suspension as in the conventional system, thus bringing the system into a compact arrangement.

BRIEF DESCRIPTION OF THE DRAWINGS

A better understanding of the invention may be had by reference to the following detailed description when taken in conjunction with the accompanying drawings, in which:

FIG. 1 is a perspective view of an automatic road wheel steering system constructed according to the teaching of the invention;

FIG. 3 is an enlarged sectional view taken along the line III—III of FIG. 2.

DESCRIPTION OF THE PREFERRED EMBODIMENTS

Figure 2:
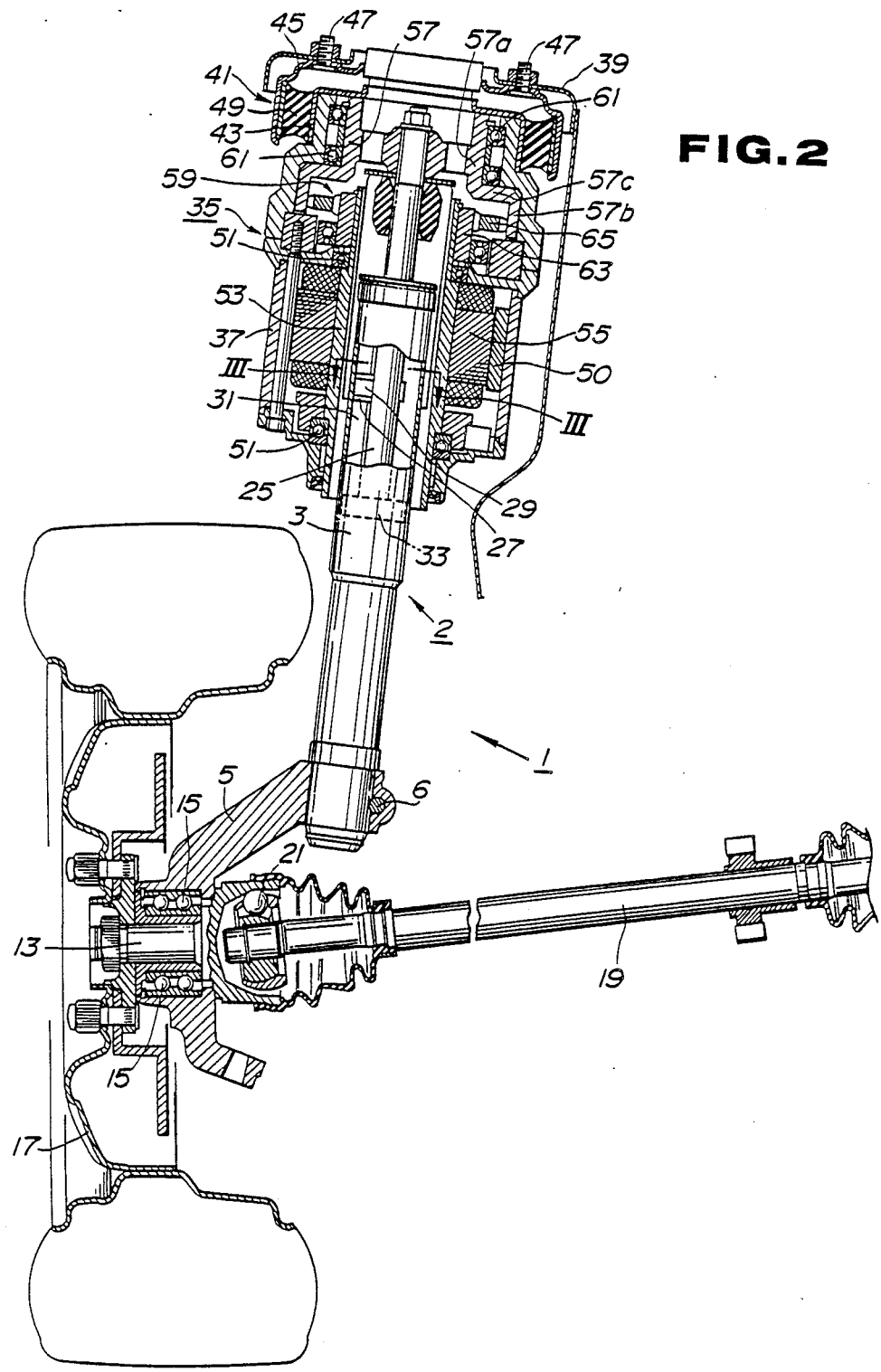
FIG. 2 is a sectional view of the system as shown in FIG. 1.

With reference to FIGS. 1 and 2, there is shown an automatic road wheel steering system generally indicated at 1 and including a strut-type suspension 2. The strut-type suspension 2 has a shock strut 3 in the form of a cylinder. A spring (not shown) is separately provided, instead of being mounted directly on the strut 3. It may be disposed between a lower control arm and a vehicle body. The illustrated suspension is designed for the left rear road wheel. It will be understood that the form and arrangement of the suspension for the right rear wheel is reversely similar. It will also be understood that the system may be used for each driven front wheel.

The shock strut 3 is fixed attached at its lower end to the upper end of a steering knuckle 5 by a bolt/nut assembly 6. The lower end of the steering knuckle 5 is connected through a ball joint (not shown) to the outer end of a lower control arm 7. The inner end of the lower control arm 7 is, in turn, pivotably connected to a crossmember 9 through a pivot connection 11. When the vehicle moves over the road, the steering knuckle 5 pivots up and down slightly. This causes the control arm 7 to swing up and down. The steering knuckle 5 receives a spindle or axle 13 through a bearing assembly 15. The spindle 13 is fixedly connected at its one end to a wheel 17 and is drivingly connected at its other end to a drive shaft 19 through a universal joint 21.

In the illustrated embodiment, a piston/piston rod assembly is slidably and rotatably received within the cylinder 3. More specifically, a piston rod 25 has three radial vanes 27 on its outer peripheral surface. Each of the vanes 27 has opposite side wings 29 which are slidably received within corresponding three axial guides 31 formed at the inner peripheral surface of the cylinder 3. The piston rod 25 is attached at its lower end to a piston 33 and at its upper end to an actuator 35.

As best seen in FIG. 2, the actuator 35 generally includes a cylindrical stator 37 mounted to a vehicle body 39 through a mount assembly 41. Specifically, the mount assembly 41 has a flanged inner plate 43 fixed to the stator 37, a flanged outer plate 45 bolted at 47 to the vehicle body 39, and an isolator 49 sandwiched between the flanges of the inner and outer plates. The stator 37 has a plurality of permanent magnets 50 on its inner peripheral surface. Rotatably supported by the stator 37 through a bearing assembly 51 is a coaxial rotor sleeve 53 which surrounds the cylinder 3 and having a coil 55. This rotor sleeve 53 is connected to a drive member 57 through a planetary-gear system or speed reducer 59 of a conventional construction. The drive member 57 has a cylindrical upper section 57a rotatably supported on the inner peripheral surface of the stator 37 through a bearing assembly 61 and connected to the upper end of the piton rod 25, and a cylindrical lower section or internal gear 57b connected to the upper section 57a through a ledge 57c and having a diameter greater than that of the upper section 57a. The speed reducer 59 generally includes a sun gear 63 fixedly mounted onto the upper end of the rotor sleeve 53, and a plurality of planet pinions 65 disposed in mesh with both the sun gear 63 and the internal or ring gear 57b.

In operation, as the rotor sleeve 53 is rotated with respect to the stator 37, the rotary motion is first carried through the speed reducer 59 to the drive member 57. This causes rotation of the piston rod 25. As the piston rod 25 is in engagement with the cylinder 3, the cylinder 3 is rotated together with the piston rod 25. The rotary motion of the piston rod 25 then causes the steering knuckle 5 to swing either forwards or backwards. The wheel 4 is finally turned in response to the swing motion of the steering knuckle 5.

It is to be understood that the forms of the invention herewith shown and described are to be taken as illustrative embodiments only of the same, and that various changes in the shapes, sizes and arrangements of parts may be resorted to without departing from the spirit of the invention as defined in the following claims.

What is claimed is:

1. A system for automatically steering a road wheel, comprising:
   a strut-type suspension including a cylinder (3), a piston rod (25) having a longitudinal axis and being reciprocable within the cylinder, and a piston (33) attached to one end of the piston rod;
   a wheel support member (5) including a steering knuckle fixed to the cylinder and rotatably supporting a road wheel thereon;
   first means, for rotating said piston rod about its longitudinal axis, mounted to a vehicle body (39) and operatively connected to the other end of said piston rod, said first means comprising a motor having a cylindrical stator (37) disposed in surrounding relation to an upper section of the cylinder and having a rotor sleeve (53) rotatably supported coaxially within said stator surrounding said cylinder and having a drive member (57) operatively connected to be driven by said rotor sleeve, said drive member being fixed to said other end of the piston rod to rotationally drive the same; and
   second means (27, 29, 31) for axially guiding said piston rod reciprocably within said cylinder, and for operatively connecting the piston rod with the cylinder so that rotary motion of the piston rod may be carried to the cylinder and the steering knuckle fixed thereto, thereby effecting steering of the road wheel.

2. The steering system of claim 1, wherein said second means comprises a plurality of axially extending guides formed on an inner peripheral surface of the cylinder, and a plurality of corresponding radial vanes formed on an outer periphery of the piston rod and fitted within said guides.

* * * * *